United States Patent [19]
Shapiro

[11] 3,762,799
[45] Oct. 2, 1973

[54] MAGNIFYING INDICATOR FOR A BURETTE

[76] Inventor: Justin Joel Shapiro, 1802 Second St., Berkeley, Calif. 94710

[22] Filed: Aug. 27, 1971

[21] Appl. No.: 175,640

[52] U.S. Cl. .............................. 350/116, 350/191
[51] Int. Cl. ......................................... G02b 27/36
[58] Field of Search ............ 350/110–116, 243, 244, 190, 191

[56] References Cited
UNITED STATES PATENTS

| | | | |
|---|---|---|---|
| 1,087,466 | 2/1914 | Sargent | 350/114 X |
| 2,405,418 | 8/1946 | Fukal | 350/243 X |
| 2,789,355 | 4/1957 | Priess | 350/114 X |
| 3,512,862 | 5/1970 | Yin | 350/110 |
| 2,586,581 | 2/1952 | Tschischeck | 350/116 |
| 2,351,455 | 6/1944 | Pratesi | 350/116 |
| 2,389,282 | 11/1945 | Stegeman | 350/116 |
| 2,565,140 | 8/1951 | Leustig | 350/116 |

FOREIGN PATENTS OR APPLICATIONS

| | | | |
|---|---|---|---|
| 342,757 | 2/1931 | Great Britain | 350/110 |
| 596,096 | 12/1947 | Great Britain | 350/110 |

*Primary Examiner*—John K. Corbin
*Attorney*—Herman L. Gordon

[57] ABSTRACT

A magnifying scale indicator for a burette wherein the indicator is adjustably mounted on a depending rod extending parallel to the scale on the burette. The indicator consists of an arcuate transparent lens bar which is a segment of an annular ring. The indicator lens bar has paired fiducial lines on opposite sides thereof and can be adjusted toward and away from the burette to vary the magnification of the burette scale. The paired fiducial lines permits this variable magnification without parallax error.

9 Claims, 5 Drawing Figures

PATENTED OCT 2 1973 3,762,799

INVENTOR
JUSTIN JOEL SHAPIRO
BY Herman L Gordon
ATTORNEY

MAGNIFYING INDICATOR FOR A BURETTE

This invention relates to scale indicators for burettes, and more particularly to a magnifying indicator for use with a dispensing burette of the type having a depending indicator-supporting rod extending parallel to its scale.

A main object of the invention is to provide a novel and improved magnifying indicator for a dispensing burette, the indicator being simple in construction, being inexpensive to manufacture, and providing accurate readings free from parallax errors.

A further object of the invention is to provide an improved transparent magnifying indicator bar adapted to be used on a dispensing burette of the type having a depending supporting rod extending parallel to its scale, the indicator bar being easy to adjust along the scale, being readily adjustable toward and away from the scale to vary the magnification thereof, having fiducial lines arranged to eliminate parallax errors regardless of the degree of magnification, and being shaped so that it can be adjusted to provide a wide range of mangification.

A still further object of the invention is to provide an improved magnifying indicator for a burette of the type having a depending support rod extending adjacent and parallel to its scale, the indicator being shaped to substantially conform with the cross-sectional shape of the burette and being adjustable toward and away from the burette barrel to vary its magnification, being very compact in size, neat in appearance and being formed from an annular ring molded, cast or machined, of transparent material, so that a plurality of identical indicators may be cut from an annular ring of stock material in an economical manner, whereby to minimize manufacturing cost and to insure a high degree of manufacturing accuracy.

A still further object of the invention is to provide an improved burette magnifying indicator which may be employed either in a standard position or in an inverted position without affecting its accuracy, and which has paired fiducial lines on its opposite surfaces to enable readings to be made without parallax errors.

Further objects and advantages of the invention will become apparent from the following description and claims, and from the accompanying drawings, wherein:

Figure 1:
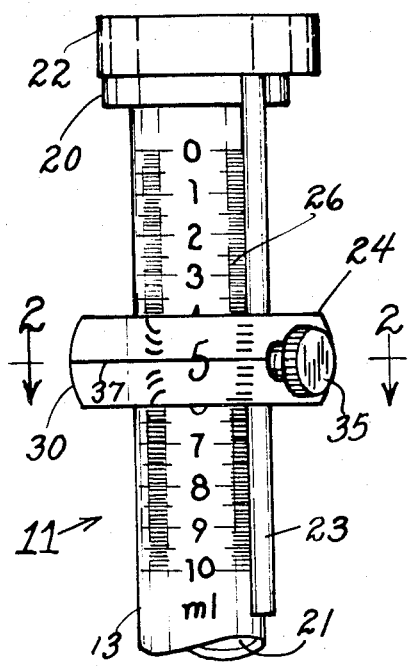
FIG. 1 is an elevational view of the upper portion of a typical dispensing burette provided with an improved magnifying indicator constructed in accordance with the present invention.

Referring to the drawings, 11 designates a dispensing burette of generally conventional design, for example, similar to the dispensing burette disclosed in U.S. Pat. No. 3,211,335 to J.J. Shapiro. Said burette is provided with a main body comprising a generally cylindrical vertical barrel portion 13 having a top flange 20 and provided with a volumetric scale 26 inscribed on barrel 13. A plunger 21 is slidably and sealingly engaged in the barrel, and said plunger is provided with an enlarged operating disc 22 eccentrically and rigidly secured to its top end. Rigidly secured to a marginal portion of disc 22 is a depending rod 23 which extends parallel to and adjacent to the barrel 13 and is provided with an adjustable magnifying indicator 24, in accordance with the present invention, which extends across and overlies the burette scale 26, providing a magnified view of the portion of the scale which it overlies.

The magnifying indicator 24 comprises an arcuate transparent lens bar of suitable transparent material, such as acrylic plastic, or the like. As will be presently described, the indicator 24 may be cut from a ring of transparent stock material, said ring having a radius somewhat greater than that of the barrel, for example, approximately equal to the radial distance of rod 23 from the axis of barrel 13. Thus, the concave inner surface of the indicator bar 24 is approximately conformably shaped relative to barrel 13 so that it can be adjusted to a position quite close to scale 26 if so desired.

The arcuate indicator bar 24 has an outer peripheral surface 30 which is vertically outwardly convex as well as horizontally outwardly convex, and has an inner vertically cylindrical surface 31, said surface 31 being the inner peripheral surface of an inwardly projecting rib 32 located midway between the top and bottom surfaces of the bar. Thus, the cylindrical inside surface 31 and the vertically outwardly convex outer surface 30 cooperate to define a horizontally extending magnifying lens with respect to the vertically spaced graduation lines of the burette scale 26.

Figure 2:
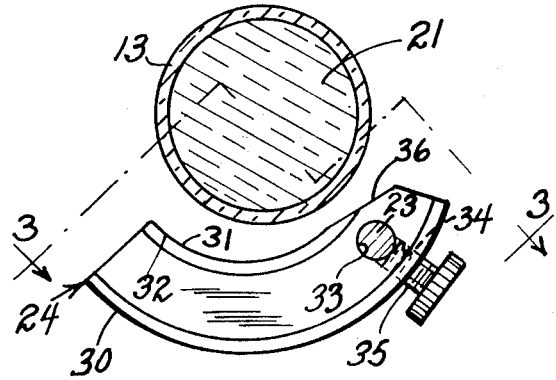
FIG. 2 is an enlarged horizontal cross-sectional view taken substantially on the line 2—2 of FIG. 1.
Figure 3:
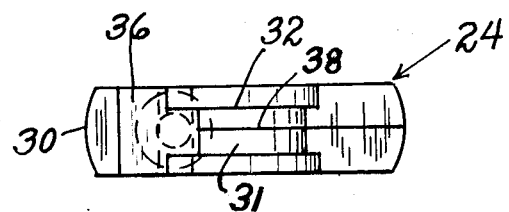
FIG. 3 is an inside elevational view of the magnifying indicator, taken substantially on the line 3—3 of FIG. 2.

Indicator bar 24 is provided adjacent one end thereof, for example, the right end thereof as viewed in FIGS. 1 and 2, with a vertical bore 33 which slidably receives the support rod 23. The bar 24 is further provided with a radial tapped, outwardly directed bore 34, intersecting bore 33 at its mid-portion, in which is threadedly engaged a headed locking thumbscrew 35 which is clampingly engageable with support rod 23 to lock indicator bar 24 in an adjusted position, both vertically along scale 26 and horizontally toward or away from said scale.

The inside corner of bar 24 adjacent support rod 23 is bevelled or cut away to define a flat clearance surface 36, providing increased clearance for outward adjustment of indicator bar 24, whereby to provide a relatively high degree of magnification if so desired.

Inscribed on the convex outer surface 30 of indicator bar 24 in the horizontal center plane thereof is a first horizontal fiducial line 37. Inscribed on the cylindrical concave inner surface 31 of bar 24, also in its horizontal center plane, is a second horizontal fiducial line 38. The fiducial lines 37 and 38 are preferably of different color from the graduation lines of scale 26. Thus, if the lines of scale 26 are black, the fiducial lines 37 and 38 are preferaby red. The red lines stand out brilliantly against the black scale 26. It will be further apparent that parallax error is eliminated by reading the scale through the indicator bar 24 with the outer and inner fiducial lines 37 and 38 superimposed. Only when viewed along the plane of the paired fiducial lines 37 and 38 will the scale lines in the central portion of the field of the magnifying bar appear relatively straight and undistorted, whereas when viewed from another angle the scale lines will be curved and distorted, as at the upper and lower portions of the left side of the magnifying bar in FIG. 1 (where the magnification is somewhat greater than at the right side). This feature particularly forces the user to make a proper setting of the magnifier.

In a typical embodiment of the invention, magnification could be varied over a range of from about 2X to about 10X by varying the outwardly adjusted distance of lens bar 24 from barrel 13.

Because of the high degree of magnification which is available, the indicator bar 24 is resettable with a high degree of accuracy, thereby greatly increasing the reliability of performance of the associated burette.

Figure 4:
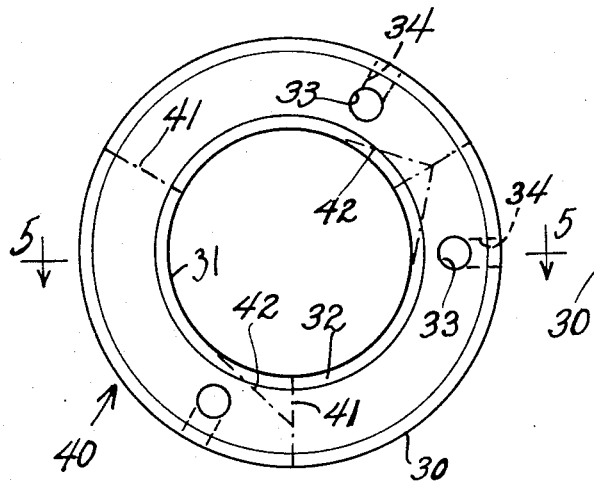
FIG. 4 is a plan view of an annular ring of transparent stock material, illustrating the manner in which the ring may be machined and cut to produce a plurality of magnifying indicators, similar to that illustrated in FIGS. 1, 2 and 3, from a single ring of stock material.
Figure 5:
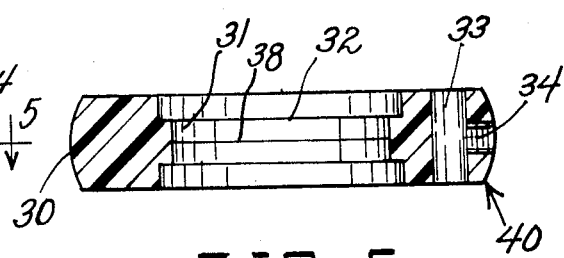
FIG. 5 is a transverse vertical cross-sectional view taken substantially on the line 5—5 of FIG. 4.

Referring now to FIGS. 4 and 5, it will be seen that a plurality of identical indicator bars 24 may be fabricated simultaneously from a common annular stock ring 40 of suitable transparent material, such as molded, cast or machined transparent acrylic plastic material. The ring 40 is formed with the outwardly convex substantially spherical peripheral lens surface 30 and with the inside rib 32 having the cylindrical inner lens surface 31. The ring may be cut into a number of equal segments, for example, into three equal segments, along radial planes 41 spaced apart by 120°. Prior to cutting, the ring 40 may be drilled to provide the vertical rod-receiving bores 33 at their proper locations, and may be drilled and tapped to provide the radial thumbscrew bores 34. After the ring has been cut radially, as above described, the inside bevels or flats 36 may be formed by cutting off the corners vertically at the planes 42 adjacent the bores 33, as shown in FIG. 4.

The outer and inner fiducial lines 37 and 38 may be formed or inscribed on the outer and inner peripheral surfaces of ring 40 at any time prior to its segmentation.

Due to the fact that the indicator bar 24 is symmetrical with respect to its central horizontal plane, containing the paired fiducial lines 37 and 38 and the axis of clamping screw 35, the indicator bar 24 may be employed either in its normal position, as shown in FIG. 1, or in an inverted position, if so desired, without any loss of accuracy.

While a specific embodiment of an improved magnifying indicator for a burette has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a burette, a barrel, a scale on said barrel, an indicator support rod extending adjacent said barrel and parallel to said scale, a transparent magnifying lens bar, means connecting said lens bar to said support rod so that the lens bar transversely overlies said scale, and longitudinal fiducial line means on said lens bar for indicating a linear region on a magnified portion of the scale visible through said lens bar, wherein said barrel contains a movable plunger and said indicator support rod is rigidly connected to said plunger.

2. The burette of claim 1, and wherein said fiducial line means comprises a first fiducial line on the outer surface of said transparent lens bar and a second fiducial line on the inside surface of said transparent lens bar parallel to said first fiducial line, said linear region of the scale being in line with the two fiducial lines.

3. The burette of claim 2, and wherein said lens bar has a bore slidably and rotatably receiving said support rod, and said means connecting the lens bar to the support rod comprises a rotary clamping element on the lens bar clampingly engageable with said support rod.

4. The burette of claim 3, wherein said bore is located adjacent one end of said lens bar.

5. The burette of claim 4, and wherein said lens bar is arcuately curved and is substantially conformable in shape to said barrel at its inside surface.

6. The burette of claim 5, and wherein said lens bar is substantially bevelled at its inside corner adjacent the support rod to provide clearance for adjusting the lens bar outwardly from the barrel.

7. The burette of claim 5, and wherein said lens bar is a segment of an annular ring of transparent material.

8. The burette of claim 5, and wherein said lens bar has a spherically convex outer lens surface and a substantially cylindrical concave inner lens surface, said fiducial lines being located in a common central plane of the lens bar extending normal to the axis of said cylindrical inner lens surface.

9. The burette of claim 8, and wherein the axis of said rotary clamping element is located substantially in said common central plane of the lens bar.

* * * * *